US012353668B2

(12) United States Patent
Wen et al.

(10) Patent No.: US 12,353,668 B2
(45) Date of Patent: Jul. 8, 2025

(54) TOUCH-CONTROL DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Ping Wen, Beijing (CN); Fan He, Beijing (CN); Shun Zhang, Beijing (CN); Yuanqi Zhang, Beijing (CN); Chang Luo, Beijing (CN); Yi Zhang, Beijing (CN); Fengli Ji, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/561,738

(22) PCT Filed: Oct. 22, 2021

(86) PCT No.: PCT/CN2021/125552
§ 371 (c)(1),
(2) Date: Nov. 17, 2023

(87) PCT Pub. No.: WO2022/247120
PCT Pub. Date: Dec. 1, 2022

(65) Prior Publication Data
US 2024/0241612 A1    Jul. 18, 2024

(30) Foreign Application Priority Data
May 25, 2021  (CN) .......................... 202110568886.X

(51) Int. Cl.
*G06F 3/044*   (2006.01)
*G06F 3/041*   (2006.01)

(52) U.S. Cl.
CPC ........ *G06F 3/0448* (2019.05); *G06F 3/04164* (2019.05); *G06F 3/0443* (2019.05)

(58) Field of Classification Search
CPC ... G06F 3/0448; G06F 3/04164; G06F 3/0443
See application file for complete search history.

(56) References Cited

U.S. PATENT DOCUMENTS

2013/0285980 A1   10/2013  Oya
2014/0174902 A1   6/2014   Yang et al.
(Continued)

FOREIGN PATENT DOCUMENTS

CN    101833404 A    9/2010
CN    104111759 A    10/2014
(Continued)

OTHER PUBLICATIONS

International Search Report for PCT/CN2021/125552 Mailed Feb. 11, 2022.

*Primary Examiner* — Matthew A Eason
*Assistant Examiner* — Scott D Au
(74) *Attorney, Agent, or Firm* — Ling Wu; Stephen Yang; Ling and Yang Intellectual Property

(57) ABSTRACT

Disclosed are a touch-control display panel and a display apparatus. The touch-control display panel includes: a plurality of first touch-control electrodes, each of which includes a plurality of first sub-electrode groups, a first sub-electrode group includes a plurality of first sub-electrodes, a first sub-electrode includes two first pattern blocks, a second pattern block located between the two first pattern blocks, and a first connection portion connecting the second pattern block and a first pattern block, which are arranged along a first direction; and a plurality of second touch-control electrodes, each of which includes a plurality of second sub-electrode groups, a second sub-electrode group includes a plurality of second sub-electrodes, a second (Continued)

sub-electrode includes two third pattern blocks, a fourth pattern block located between the two third pattern blocks, and a second connection portion connecting a third pattern block and the fourth pattern block, which are arranged along the first direction.

16 Claims, 10 Drawing Sheets

(56) References Cited

U.S. PATENT DOCUMENTS

| | | | |
|---|---|---|---|
| 2015/0042598 A1* | 2/2015 | Chae | ............... G06F 3/041 345/174 |
| 2017/0255303 A1 | 9/2017 | Huang et al. | |
| 2019/0079622 A1 | 3/2019 | Choi et al. | |
| 2020/0073514 A1 | 3/2020 | Kuo | |
| 2021/0096680 A1 | 4/2021 | Li et al. | |
| 2021/0405823 A1 | 12/2021 | Wu et al. | |
| 2023/0200145 A1 | 6/2023 | Ye | |

FOREIGN PATENT DOCUMENTS

| | | |
|---|---|---|
| CN | 107153474 A | 9/2017 |
| CN | 108196736 A | 6/2018 |
| CN | 108803945 A | 11/2018 |
| CN | 109729728 A | 5/2019 |
| CN | 111638812 A | 9/2020 |
| CN | 111651091 A | 9/2020 |
| CN | 111651092 A | 9/2020 |
| CN | 112083830 A | 12/2020 |
| CN | 112639706 A | 4/2021 |
| CN | 112684934 A | 4/2021 |
| CN | 113157142 A | 7/2021 |
| EP | 2735948 A1 | 5/2014 |
| WO | 2012096210 A1 | 7/2012 |
| WO | 2014026449 A1 | 2/2014 |

* cited by examiner

TOUCH-CONTROL DISPLAY PANEL AND DISPLAY APPARATUS

CROSS-REFERENCE TO RELATED APPLICATIONS

The present application is a U.S. National Phase Entry of International Application No. PCT/CN2021/125552 having an international filing date of Oct. 22, 2021, which claims the priority to the Chinese patent application No. 202110568886.X entitled "Touch-Control Display Panel and Display Apparatus", filed to the CNIPA on May 25, 2021. Entire contents of the above-identified applications are hereby incorporated by reference.

TECHNICAL FIELD

The present disclosure relates to the technical field of semiconductors, in particular to a touch-control display panel and a display apparatus.

BACKGROUND

A Flexible Multi-Layer On Cell (FMLOC) design has become a mainstream in the field of Organic Light Emitting Diode (OLED) touch-control display, and is a main process direction especially in the mobile phone screen industry. The FMLOC design means that a metal grid electrode layer is manufactured on an encapsulated drive backplane of a display panel, so as to carry out touch-control control, there is no need for an external Touch Screen Panel (TSP). This process may reduce a screen thickness, improve a yield, and reduce a cost.

At present, customers have higher and higher requirements for FMLOC performance, especially improvement of a touch control semaphore (a change amount of mutual capacitance between an emitting electrode and a receiving electrode before and after touch control), so as to meet a demand of a high point reporting rate. Especially in folding products, since a Module (MDL) stack is relatively thin, a larger signal amount is needed to prevent a problem of ghost point during weakly grounding, so it is necessary to develop new touch-control graphics to improve the touch control semaphore.

SUMMARY

The present disclosure provides a touch-control display panel and a display apparatus, so as to solve problems in the prior art that ghost points are prone to being generated in a touch control process and a touch control semaphore is weak.

An embodiment of the present disclosure provides a touch-control display panel, including: a plurality of first touch-control electrodes, wherein each first touch-control electrode includes a plurality of first sub-electrode groups sequentially arranged along a first direction, adjacent first sub-electrode groups are connected through a bridge; a first sub-electrode group includes a plurality of first sub-electrodes sequentially arranged along a second direction and connected, a first sub-electrode includes two first pattern blocks, a second pattern block located between the two first pattern blocks, and a first connection portion that connects the second pattern block and a first pattern block, which are arranged along the first direction; and a plurality of second touch-control electrodes, wherein each second touch-control electrode includes a plurality of second sub-electrode groups sequentially arranged along the second direction and integrally connected; a second sub-electrode group includes a plurality of second sub-electrodes sequentially arranged along the second direction and connected, a second sub-electrode includes two third pattern blocks, a fourth pattern block located between the two third pattern blocks, and a second connection portion connecting a third pattern block and the fourth pattern block, which are arranged along the first direction; the second sub-electrode is located within a region surrounded by the first sub-electrode, and has substantially a same pattern as the surrounded region, and the second touch-control electrode and the first touch-control electrode are insulated from each other.

In one possible implementation mode, the first pattern block, the second pattern block, the third pattern block, and the fourth pattern block are convex polygons.

In one possible implementation mode, the first pattern block is hexagonal and the second pattern block is prismatic; and the third pattern block is hexagonal and the fourth pattern block is prismatic.

In one possible implementation mode, the second pattern block has a first diagonal parallel to the second direction, two first pattern blocks of a same first sub-electrode are symmetrical about the first diagonal; and the fourth pattern block has a second diagonal parallel to the second direction, and two third pattern blocks of a same second sub-electrode are symmetrical about the second diagonal.

In one possible implementation mode, a maximum width of the second pattern block parallel to the second direction is greater than a maximum width of the first pattern block parallel to the second direction; and a maximum width of the fourth pattern block parallel to the second direction is greater than a maximum width of the third pattern block parallel to the second direction.

In one possible implementation mode, the first connection portion is rectangular, and a width of the first connection portion parallel to the second direction is smaller than a maximum width of the first pattern block parallel to the second direction; and the second connection portion is rectangular, and a width of the second connection portion parallel to the second direction is smaller than a maximum width of the third pattern block parallel to the second direction.

In one possible implementation mode, the first sub-electrode group includes three first sub-electrodes sequentially arranged along the second direction, which are respectively two first auxiliary electrodes, and a first main body electrode located between the two first auxiliary electrodes; the second sub-electrode group includes three second sub-electrodes sequentially arranged along the second direction, which are respectively two second auxiliary electrodes and a second main body electrode located between the two second auxiliary electrodes; and one of the second auxiliary electrodes is spaced between a first symmetry axis of the second main body electrode parallel to the first direction and a second symmetry axis of the first main body electrode parallel to the first direction.

In one possible implementation mode, the adjacent first sub-electrode groups are connected by the first main body electrode through a bridge.

In one possible implementation mode, there is a first hollow region within the first pattern block of a first auxiliary electrode, and there are four second hollow regions within second pattern blocks of the first auxiliary electrode and the first main body electrode; the touch-control display panel further includes a first floating electrode located in the first hollow region and a second floating electrode located in the second hollow region; and the third pattern block and the fourth pattern block of the second auxiliary electrode, and the third pattern block of the second main body electrode all also have a third hollow region, and there are also four fourth hollow regions within the fourth pattern block of the second main body electrode; and the touch-control display panel further includes a third floating electrode located in the third hollow region and a fourth floating electrode located in the fourth hollow region.

In one possible implementation mode, the first floating electrode is quadrilateral and a diagonal of the first floating electrode is parallel to the first direction; the second floating electrode is quadrilateral, and an outer contour surrounded by four second floating electrodes within a same second pattern block is similar to a shape of the second pattern block, and centers are substantially coincident; and the third floating electrode is quadrilateral, and a diagonal of the third floating electrode is parallel to the first direction; the fourth floating electrode is quadrilateral, and an outer contour surrounded by four fourth floating electrodes within a same fourth pattern block is similar to a shape of the fourth pattern block, and centers are substantially coincident.

In one possible implementation mode, the first touch-control electrode and the second touch-control electrode are disposed in a same layer and of a same material.

In one possible implementation mode, the touch-control display panel includes a base substrate, a display layer located between the base substrate and the first touch-control electrode, a metal layer located between the display layer and the first touch-control electrode, and an insulation layer located between the metal layer and the first touch-control electrode; and the metal layer includes a bridge portion that electrically connects first sub-electrodes of adjacent first sub-electrode groups through a via penetrating through the insulation layer.

In one possible implementation mode, the display layer has a plurality of sub-pixels; and the first sub-electrode and the second sub-electrode each include a plurality of holes, and an orthographic projection of a hole on the base substrate corresponds to an orthographic projection of a sub-pixel on the base substrate.

In one possible implementation mode, there is also an encapsulation layer between the metal layer and the display layer.

An embodiment of the present disclosure also provides a display apparatus, including the touch-control display panel according to the embodiment of the present disclosure.

The embodiment of the present disclosure has following beneficial effects: in the embodiment of the present disclosure, a first touch-control electrode includes a plurality of first sub-electrode groups sequentially arranged along a first direction; a first sub-electrode group includes a plurality of first sub-electrodes sequentially arranged along a second direction CD and integrally connected, a first sub-electrode includes two first pattern blocks, a second pattern block located between the two first pattern blocks, and a first connection portion connecting the second pattern block and a first pattern block, which are arranged along the first direction; each second touch-control electrode includes a plurality of second sub-electrode groups sequentially arranged along the second direction and connected; a second sub-electrode group includes a plurality of second sub-electrodes sequentially arranged along the second direction and connected, a second sub-electrode includes two third pattern blocks, a fourth pattern block located between the two third pattern blocks, and a second connection portion connecting a third pattern block and the fourth pattern block, which are arranged along the first direction, so that the first touch-control electrode and the second touch-control electrode may form relatively large interaction, thereby solving problems in the prior art that ghost points are prone to being generated in a touch control process and a touch control semaphore is weak.

DETAILED DESCRIPTION

In order to make objectives, technical solutions, and advantages of the embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, not all of the embodiments. Based on the described embodiments of the present disclosure, all other embodiments obtained by those of ordinary skill in the art without creative labor all belong to the protection scope of the present disclosure.

Unless otherwise defined, technical terms or scientific terms used in the present disclosure should have meanings as commonly understood by those of ordinary skill in the art that the present disclosure belongs to. "First", "second", and similar words used in the present disclosure do not indicate any order, quantity, or importance, but are used only for distinguishing different components. "Include", "contain", or similar words mean that elements or objects appearing before the words cover elements or objects listed after the words and their equivalents, but do not exclude other elements or objects. "Connect", "interconnect", or a similar word is not limited to a physical or mechanical connection, but may include an electrical connection, whether direct or indirect. "Upper", "lower", "left", and "right", etc., are used for representing relative positional relationships, and when an absolute position of a described object is changed, a relative positional relationship may also be correspondingly changed.

In order to keep following description of the embodiments of the present disclosure clear and concise, detailed description of known functions and known components are omitted in the present disclosure.

Figure 3:
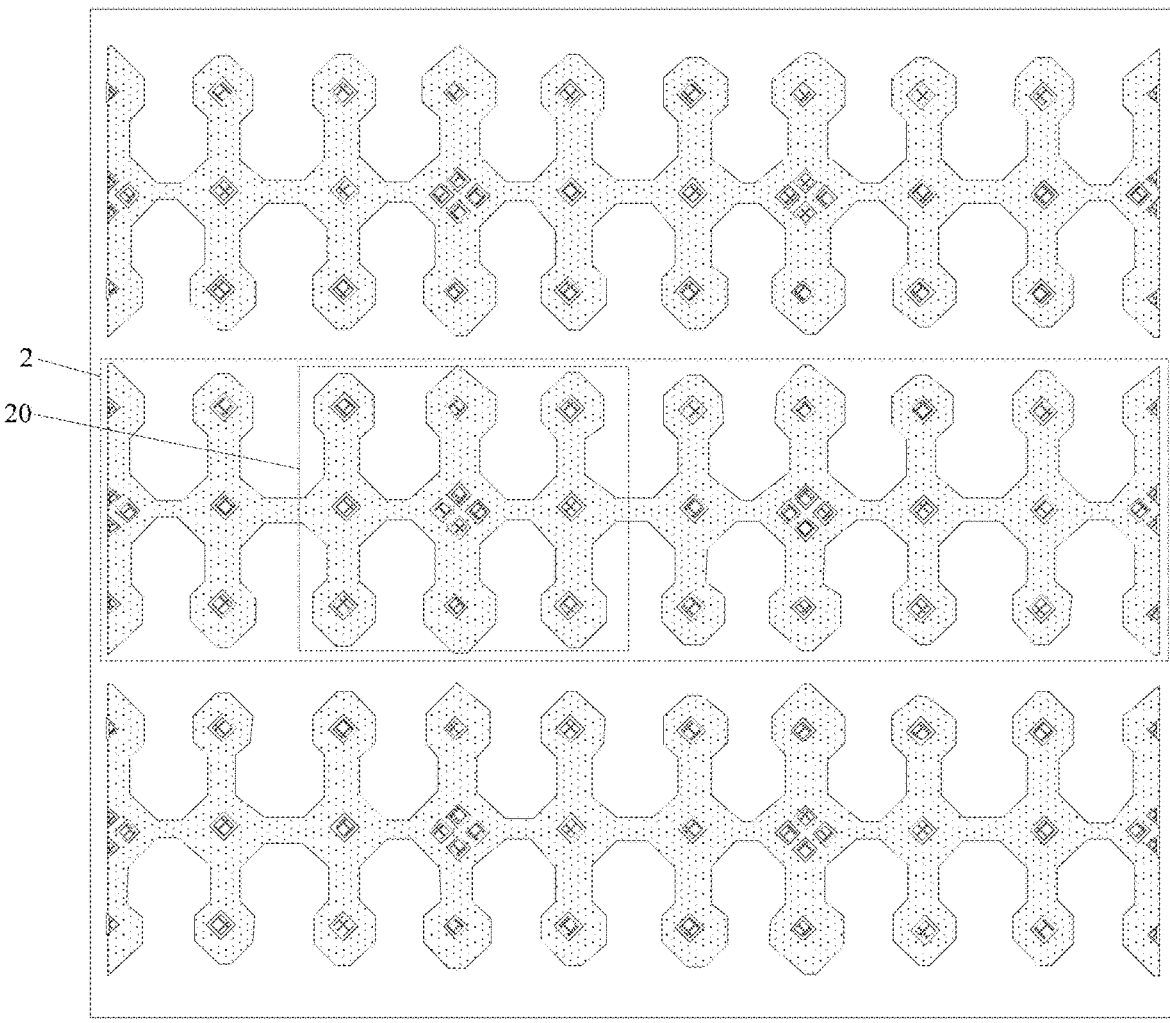
FIG. 3 is a schematic diagram of a single film layer of a second touch-control electrode according to the embodiment of the present disclosure.
Figure 4:
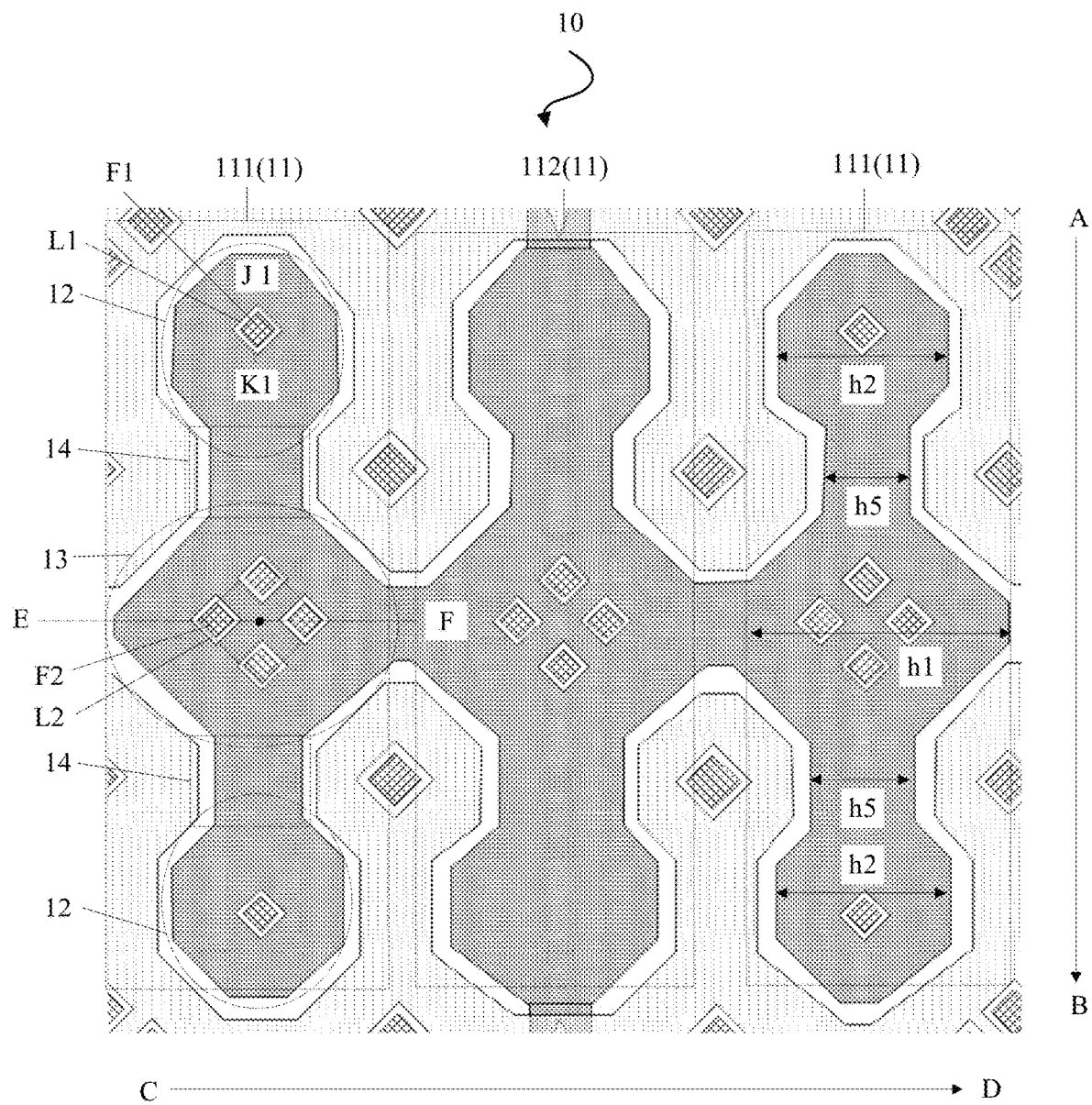
FIG. 4 is an enlarged schematic diagram of a first sub-electrode group according to an embodiment of the present disclosure.
Figure 5:
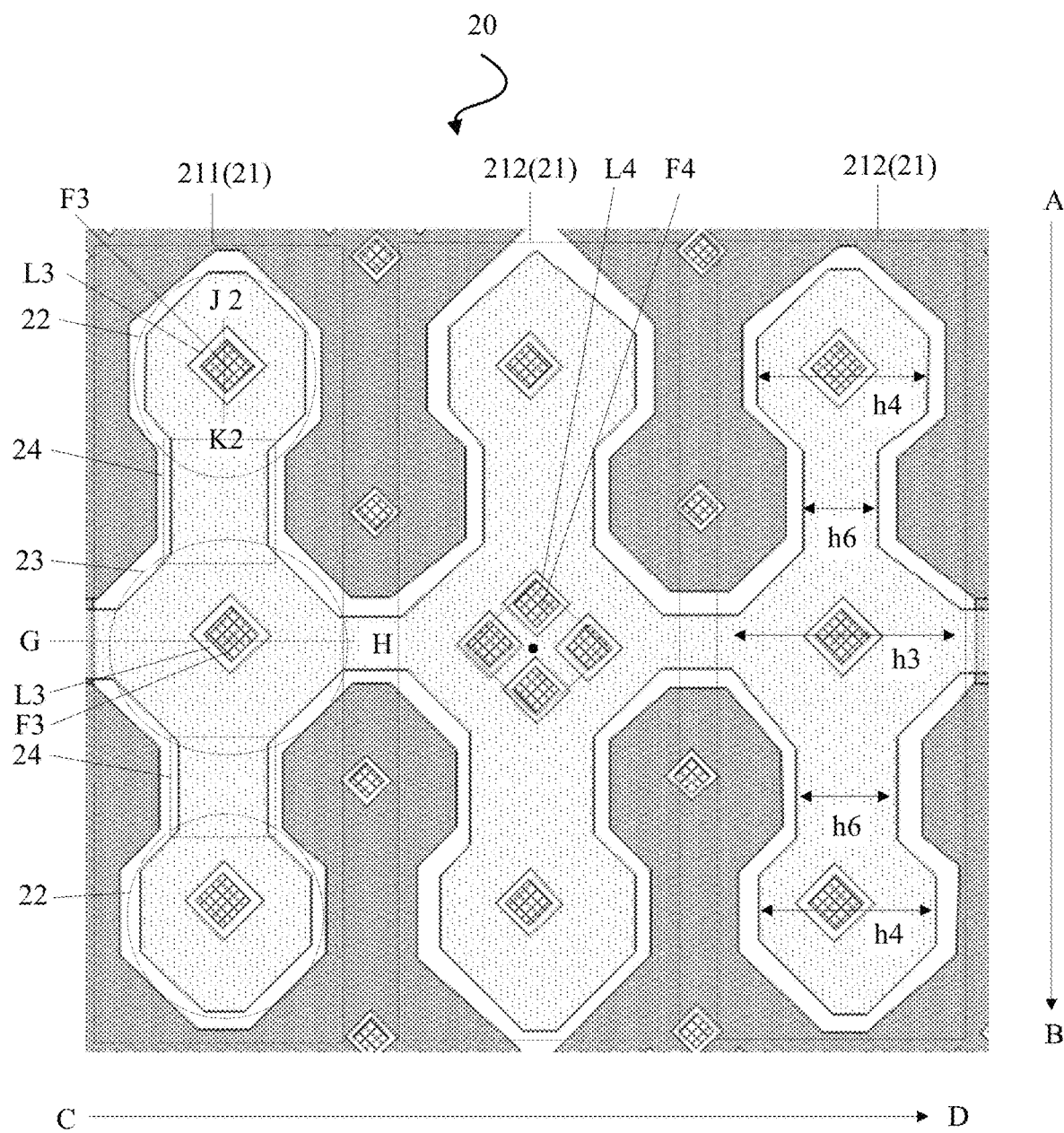
FIG. 5 is an enlarged schematic diagram of a second sub-electrode group according to an embodiment of the present disclosure.

Referring to FIGS. 1-5, FIG. 2 is a diagram of a single film layer of a first touch-control electrode 1, FIG. 3 is a diagram of a single film layer of a second touch-control electrode 2, FIG. 4 is an enlarged schematic diagram of a first sub-electrode group, and FIG. 5 is an enlarged schematic diagram of a second sub-electrode group. An embodiment of the present disclosure provides a touch-control display panel, including: a plurality of first touch-control electrodes 1, wherein each first touch-control electrode 1 includes a plurality of first sub-electrode groups 10 sequentially arranged along a first direction AB, adjacent first sub-electrode groups 10 are connected through a bridge; a first sub-electrode group 10 includes a plurality of first sub-electrodes 11 sequentially arranged along a second direction CD and integrally connected, a first sub-electrode 11 includes two first pattern blocks 12, a second pattern block 13 located between the two first pattern blocks 12, and a first connection portion 14 that connects the second pattern block 13 and a first pattern block 12, which are arranged along the first direction; and a plurality of second touch-control electrodes 2, wherein each second touch-control electrode 2 includes a plurality of second sub-electrode groups 20 sequentially arranged along the second direction CD and integrally connected; a second sub-electrode group 20 includes a plurality of second sub-electrodes 21 sequentially arranged along the second direction CD and integrally connected, a second sub-electrode 21 includes two third pattern blocks 22, a fourth pattern block 23 located between the two third pattern blocks 22, and a second connection portion connecting a third pattern block 22 and the fourth pattern block 23, which are arranged along the first direction AB; the second sub-electrode 21 is located within a region surrounded by the first sub-electrode 11, and has substantially a same pattern as that of the surrounded region, a pattern of the second sub-electrode 21 and a pattern of the first sub-electrode 11 are complementary to each other, and the second touch-control electrode 21 and the first touch-control electrode 11 are insulated from each other. Specifically, the second sub-electrode 21 has substantially the same pattern as that of the region surrounded by the first sub-electrode 11, which may be understood as that a coincidence degree of the two may be 80% to 100%.

In an embodiment of the present disclosure, the first touch-control electrode 1 includes a plurality of first sub-electrode groups 10 sequentially arranged along a first direction AB; a first sub-electrode group 10 includes a plurality of first sub-electrodes 11 sequentially arranged along a second direction CD and integrally connected, a first sub-electrode 11 includes two first pattern blocks 12, a second pattern block 13 located between the two first pattern blocks 12, and a first connection portion 14 connecting the second pattern block 13 and a first pattern block 12, which are arranged along the first direction; each second touch-control electrode 2 includes a plurality of second sub-electrode groups 20 sequentially arranged along the second direction CD and integrally connected; a second sub-electrode group 20 includes a plurality of second sub-electrodes 21 sequentially arranged along the second direction CD and integrally connected, a second sub-electrode 21 includes two third pattern blocks 22, a fourth pattern block 23 located between the two third pattern blocks 22, and a second connection portion 24 connecting a third pattern block 22 and the fourth pattern block 23, which are arranged along the first direction AB, so that the first touch-control electrode 1 and the second touch-control electrode 2 may form relatively large interaction, thereby solving problems in the prior art that ghost points are prone to being generated in a touch control process and a touch control semaphore is weak.

In one possible implementation mode, the first pattern block 12, the second pattern block 13, the third pattern block 22, and the fourth pattern block 23 are convex polygons as shown in conjunction with FIGS. 1-5. Specifically, the first pattern block 12 is hexagonal, the second pattern block 13 is prismatic, the third pattern block 22 is hexagonal, and the fourth pattern block 23 is prismatic. In an embodiment of the present disclosure, the first pattern block 12 is hexagonal, the second pattern block 13 is prismatic, the third pattern block 22 is hexagonal, and the fourth pattern block 23 is prismatic, so that the first touch-control electrode 1 and the second touch-control electrode 2 may form relatively large interaction, which is beneficial to forming a relatively large touch control semaphore and improving touch-control sensitivity. It should be noted that in the embodiment of the present disclosure, the first pattern block 12 is hexagonal, the second pattern block 13 is prismatic, the third pattern block 22 is hexagonal, and the fourth pattern block 23 is prismatic, which may be understood as that the first pattern block 12 is substantially hexagonal, the second pattern block 13 is substantially prismatic, the third pattern block 22 is substantially hexagonal, and the fourth pattern block 23 is substantially prismatic. Specifically, being substantially hexagonal, here substantially may be understood as that a coincidence degree with a corresponding hexagon may be 80% to 100%, in other words, a boundary of the first pattern block may have a certain radian, and an included angle between two boundaries may have a certain range. It is not strictly limited in this solution that the first pattern block 12 is of a geometrically regular hexagon. Likewise, the second pattern block 13 is substantially prismatic and is not strictly limited to of a geometrically prismatic shape. Being substantially prismatic may be understood as that a coincidence degree with a corresponding prismatic shape may be 80% to 100%.

In one possible implementation mode, as shown in conjunction with FIGS. 4 and 5, the second pattern block 13 has a first diagonal EF parallel to the second direction CD, and two first pattern blocks 12 of a same first sub-electrode 11 are symmetrical about the first diagonal EF; the fourth pattern block 23 has a second diagonal GH parallel to the second direction CD, and two third pattern blocks 22 of a same second sub-electrode 21 are symmetrical about the second diagonal GH. Specifically, the first diagonal EF is parallel to the second direction CD, which may be that they are substantially parallel, may be understood as that a range of an included angle between extension lines of the two is greater than or equal to 0°, and less than or equal to 10°. The second diagonal GH is parallel to the second direction CD, which may be that they are substantially parallel, may be understood as that a range of an included angle between extension lines of the two is greater than or equal to 0°, and less than or equal to 10°.

In one possible implementation mode, as shown in conjunction with FIGS. 4 and 5, a maximum width h1 of the second pattern block 13 parallel to the second direction CD is greater than a maximum width h2 of the first pattern block 12 parallel to the second direction CD; and a maximum width h3 of the fourth pattern block 23 parallel to the second direction CD is greater than a maximum width h4 of the third pattern block 22 parallel to the second direction CD. Specifically, within a same first sub-electrode group 10, maximum widths h1 of the second pattern blocks 13 parallel to the second direction CD may be approximately the same, and within the same first sub-electrode group 10, and maximum widths h2 of the first pattern blocks 12 parallel to the second direction CD may be approximately the same. Within a same second sub-electrode group 20, maximum widths h3 of fourth pattern blocks 23 parallel to the second direction CD may be approximately the same, and within the same second sub-electrode group 20, maximum widths h4 of third pattern blocks 22 parallel to the second direction CD may be approximately the same.

In one possible implementation mode, as shown in conjunction with FIGS. 4 and 5, the first connection portion 14 is rectangular, and a width h5 of the first connection portion 14 parallel to the second direction CD is smaller than a maximum width h1 of the first pattern block 12 parallel to the second direction CD. The second connection portion 24 is rectangular, and a width h6 of the second connection portion 24 parallel to the second direction CD is smaller than a maximum width h3 of the third pattern block 22 parallel to the second direction CD. Specifically, within a same first sub-electrode group 10, widths h5 of first connection portions 14 parallel to the second direction CD may be approximately the same; and within a same second sub-electrode group, widths h6 of second connection portions 24 parallel to the second direction CD may be approximately the same.

Figure 1:
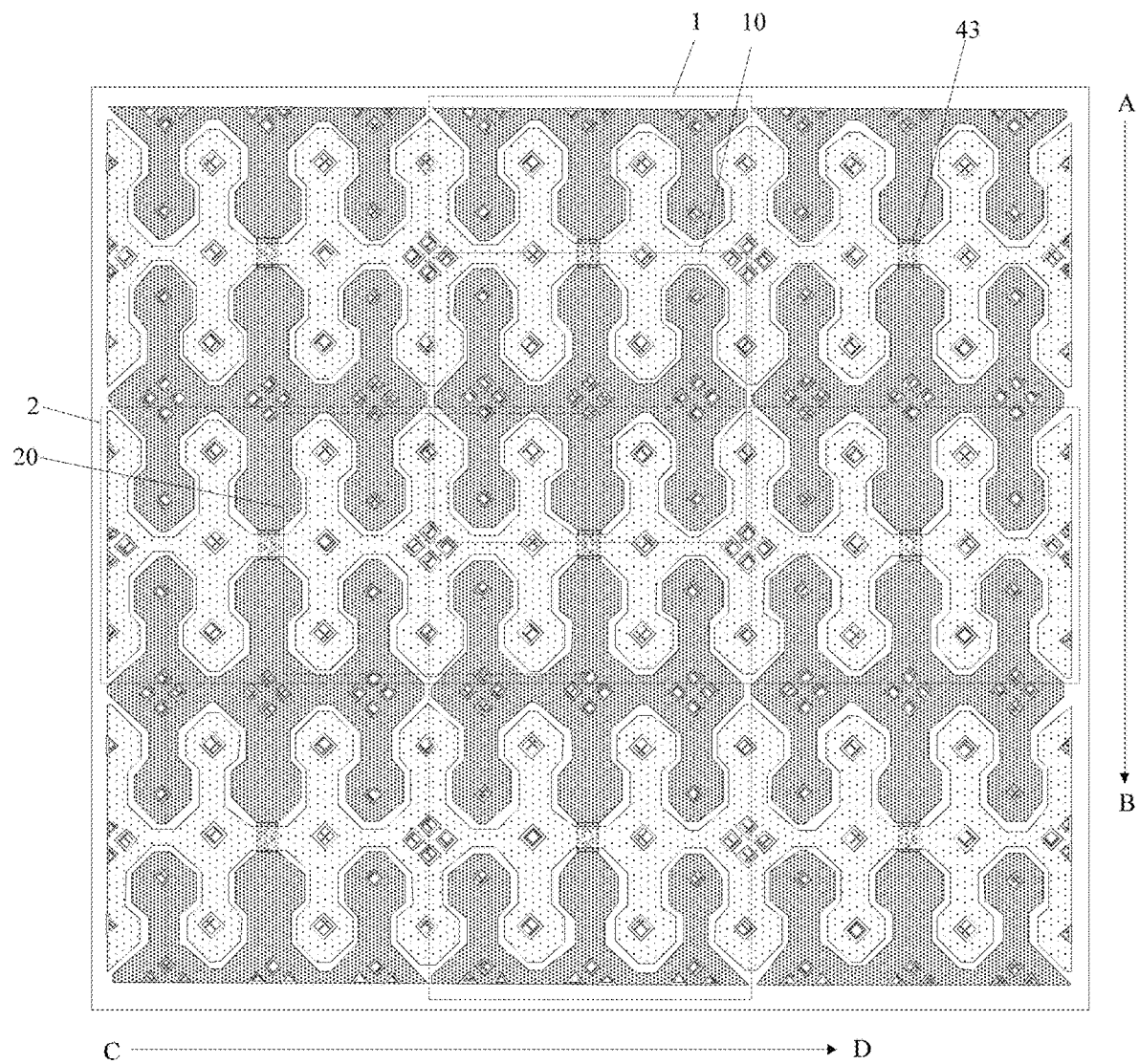
FIG. 1 is one of schematic top views of a touch-control display panel according to an embodiment of the present disclosure.
Figure 2:
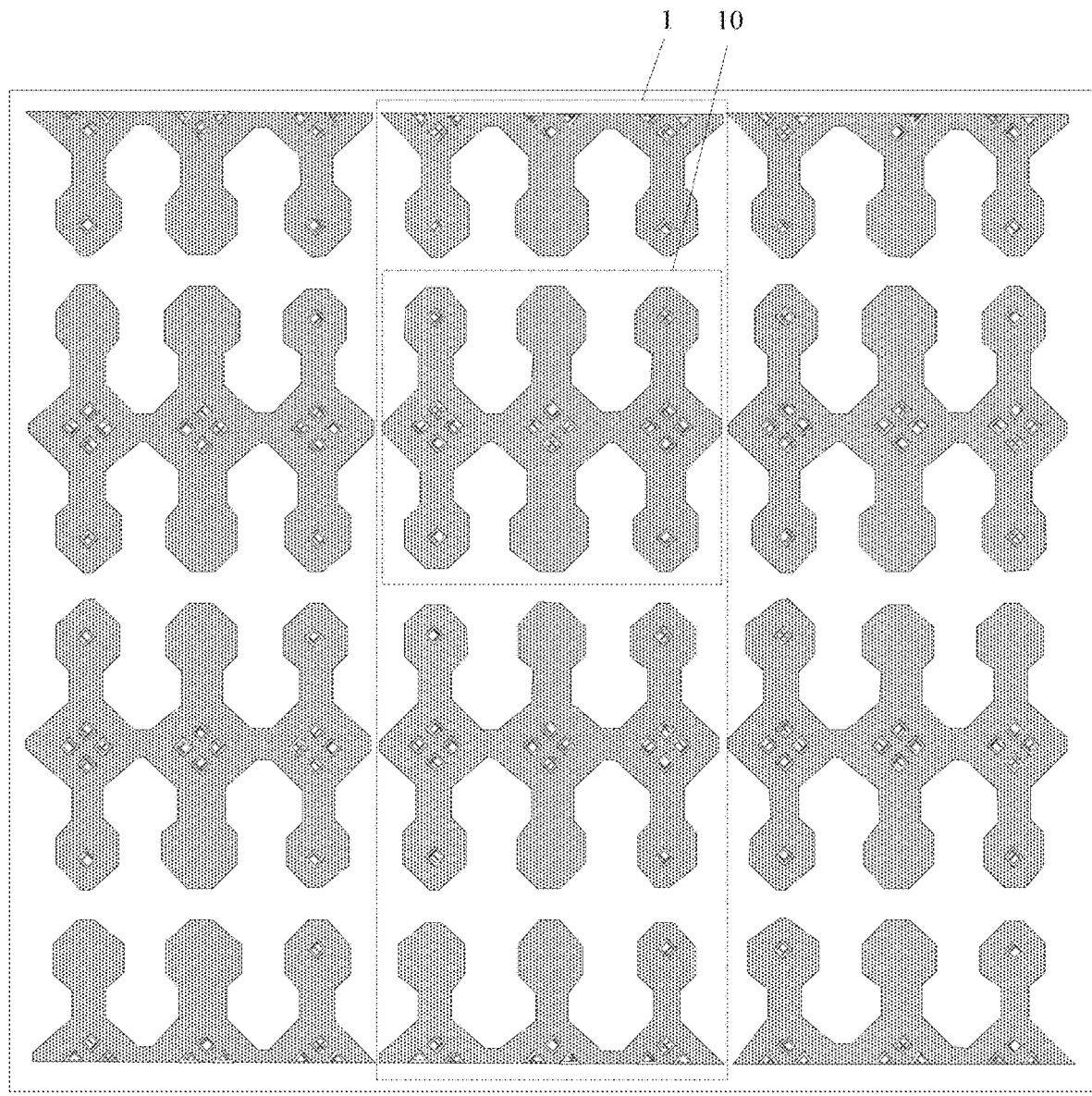
FIG. 2 is a diagram of a single film layer of a first touch-control electrode according to an embodiment of the present disclosure.

In one possible implementation mode, as shown in conjunction with FIGS. 1-6, FIG. 6 is a partially enlarged diagram of FIG. 1, each first sub-electrode group 10 includes three first sub-electrodes 11 sequentially arranged along a second direction CD, the three first sub-electrodes 11 are respectively two first auxiliary electrodes 111, and a first main body electrode 112 located between the two first auxiliary electrodes 111; each second sub-electrode group 20 includes three second sub-electrodes 11 sequentially arranged along the second direction CD, the three second sub-electrodes 11 are respectively two second auxiliary electrodes 211, and a second main body electrode 212 located between the two second auxiliary electrodes 211; and a second auxiliary electrode 111 is spaced between a first symmetry axis M1N1 of the second main body electrode 212 parallel to the first direction AB and a second symmetry axis M2N2 of the first main body electrode 112 parallel to the first direction AB. Specifically, the first symmetry axis M1N1 is parallel to the first direction AB, which may be that they are substantially parallel, may be understood as that a range of an included angle between extension lines of the two is greater than or equal to 0°, and less than or equal to 10°. The second symmetry axis M2N2 is parallel to the first direction AB, which may be that they are substantially parallel, may be understood as that a range of an included angle between extension lines of the two is greater than or equal to 0°, and less than or equal to 10°.

Figure 6:
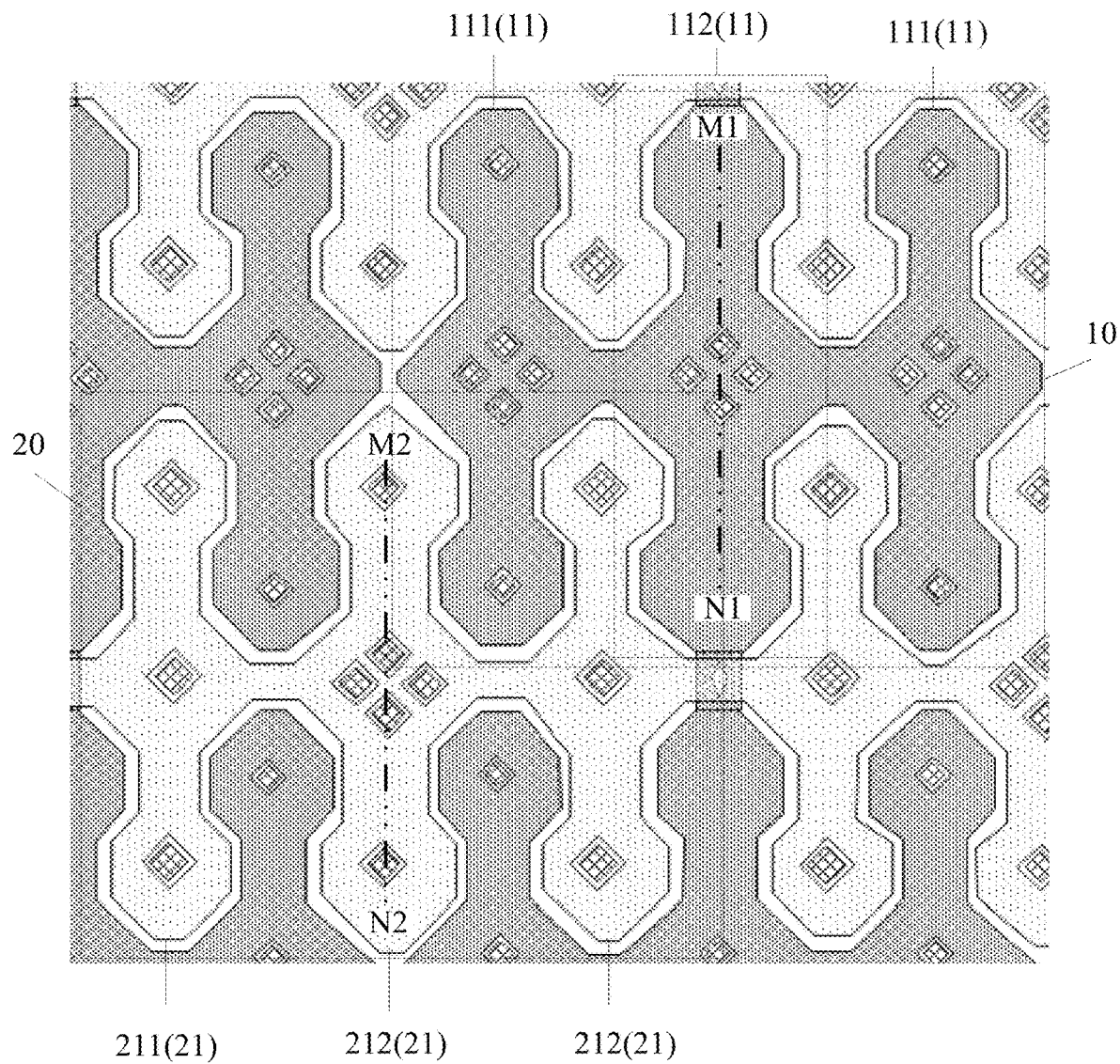
FIG. 6 is a partially enlarged diagram of FIG. 1.
Figure 7:
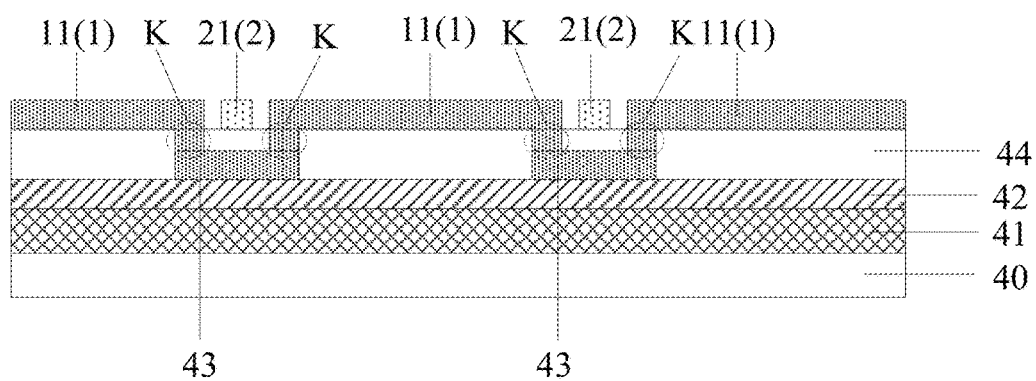
FIG. 7 is a sectional schematic diagram of a touch-control display panel according to an embodiment of the present disclosure.

In one possible implementation mode, as shown in conjunction with FIG. 1 or FIG. 6, adjacent first sub-electrode groups 10 are connected by the first main body electrode 112 through a bridge. In an embodiment of the present disclosure, compared with connecting each first sub-electrode 11 of adjacent first sub-electrode groups 10 correspondingly through a bridge, the adjacent first sub-electrode groups 10 are connected by the first main body electrode 112 through the bridge, which may simplify a manufacturing process of the touch-control display panel under a condition that it is achieved that different first sub-electrode groups 10 are electrically connected.

In one possible implementation mode, as shown in conjunction with FIG. 4 or FIG. 5, there is a first hollow region L1 within the first pattern block 12 of the first auxiliary electrode 111, and there are four second hollow regions L2 within second pattern blocks 13 of the first auxiliary electrode 111 and the first main body electrode 112. The touch-control display panel further includes a first floating electrode F1 located in the first hollow region L1 and a second floating electrode F2 located in a second hollow region L2. The third pattern block 22 and the fourth pattern block 23 of the second auxiliary electrode 211, and the third pattern block 22 of the second main body electrode 212 also have a third hollow region L3, and there are also four fourth hollow regions L4 within the fourth pattern block 23 of the second main body electrode 212. The touch-control display panel further includes a third floating electrode F3 located in a third hollow region L3 and a fourth floating electrode F4 located in a fourth hollow region L4. In this way, there are a relatively small resistance and a relatively large touch control semaphore under a condition of ensuring better electrical connectivity. The first floating electrode F1, the second floating electrode F2, the third floating electrode F3, and the fourth floating electrode F4 may be understood as a structure in which only an electrode pattern is provided and no electrical signal is applied to the electrode pattern during use.

In one possible implementation mode, the first floating electrode F1 is quadrilateral, specifically, it may be prismatic, and a diagonal J1K1 of the first floating electrode F1 is parallel to the first direction AB. The diagonal J1K1 is parallel to the first direction AB, which may be that they are substantially parallel, may be understood as that a range of an included angle between extension lines of the two is greater than or equal to 0°, and less than or equal to 10°. The second floating electrode F2 is quadrilateral, specifically, it may be prismatic, and an outer contour surrounded by four second floating electrodes F2 within a same second pattern block 13 is similar to a shape of the second pattern block 13, and centers are substantially coincident. The third floating electrode F3 is quadrilateral, and a diagonal J2K2 of the third floating electrode F3 is parallel to the first direction AB. The diagonal J2K2 is parallel to the first direction AB, which may be that they are substantially parallel, may be understood as that a range of an included angle between extension lines of the two is greater than or equal to 0°, and less than or equal to 10°. The fourth floating electrode F4 is quadrilateral, and an outer contour surrounded by four fourth floating electrodes F4 within a same fourth pattern block 23 is similar to a shape of the fourth pattern block 23, and centers are substantially coincident. Specifically, a center of the outer contour surrounded by the four second floating electrodes F2 within the same second pattern block 13 is substantially coincident with a center of the second pattern block 13, which may be understood as that a distance difference between the two centers is less than 0.5 μm. A center of the outer contour surrounded by the four fourth floating electrodes F4 within the fourth pattern block 23 is substantially coincident with a center of the fourth pattern block 23, which may be understood as that a distance difference between the two centers is less than 0.5 μm.

In one possible implementation mode, the first touch-control electrode 1 and the second touch-control electrode 2 are disposed in a same layer and of a same material. In an embodiment of the present disclosure, the first touch-control electrode 1 and the second touch-control electrode 2 are disposed in a same layer and of a same material, which may simplify a manufacturing method of the touch-control display panel.

Figure 8:
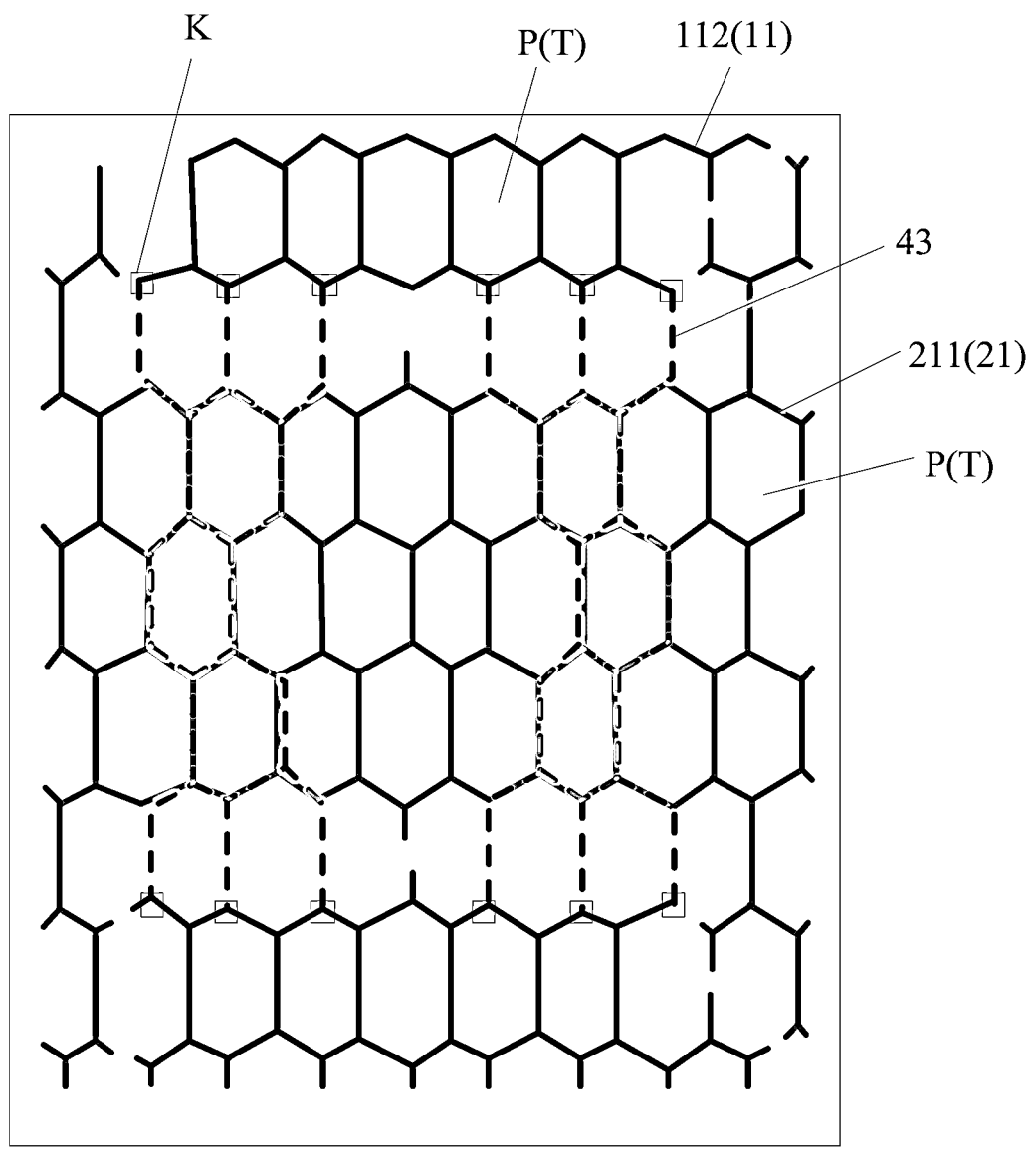
FIG. 8 is an enlarged schematic diagram of first main body electrodes of adjacent first electrode groups at a bridge connection according to an embodiment of the present disclosure.
Figure 9:
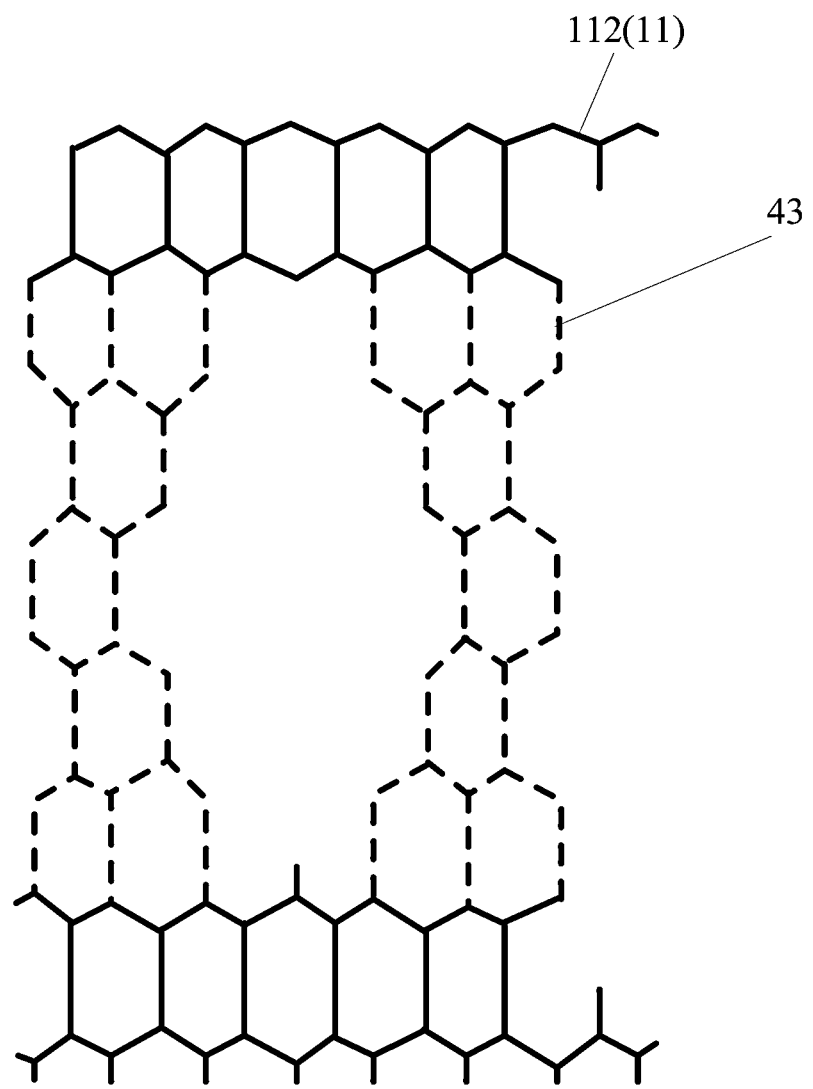
FIG. 9 is a schematic diagram of a connection between a first main body electrode and a bridge portion 43 according to an embodiment of the present disclosure.
Figure 10:
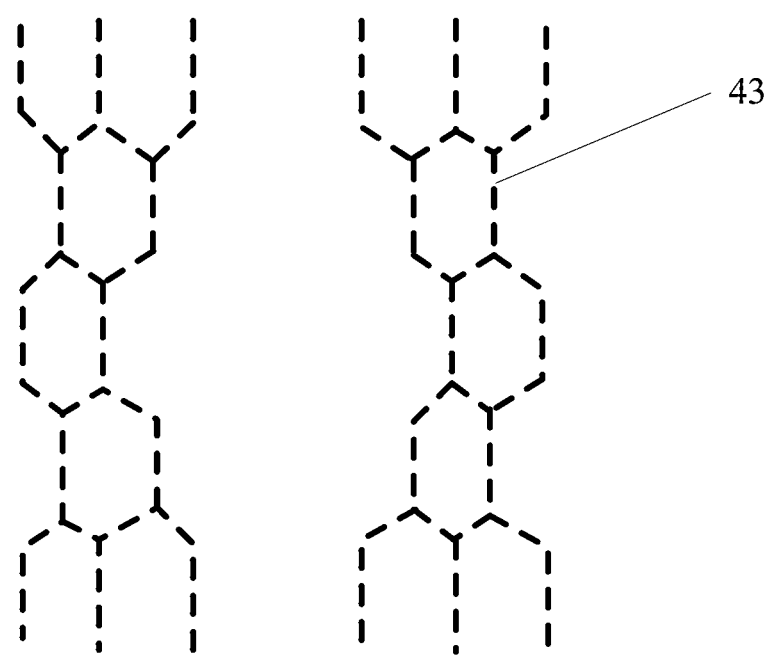
FIG. 10 is a single-layer schematic diagram of a bridge portion according to an embodiment of the present disclosure.
Figure 11:
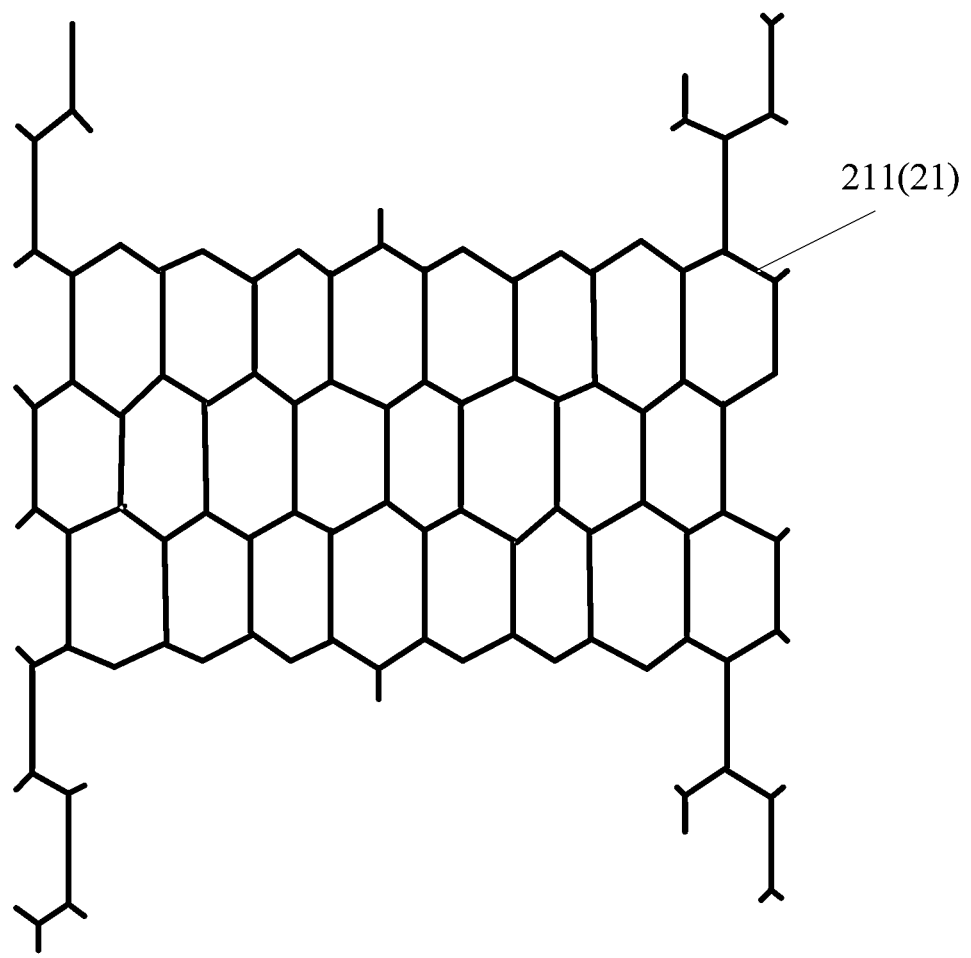
FIG. 11 is a single-layer schematic diagram of a second auxiliary electrode of a second sub-electrode according to an embodiment of the present disclosure.

In one possible implementation mode, referring to FIGS. 7-11, FIG. 8 is an enlarged schematic diagram of first main body electrodes 112 of adjacent first electrode groups 10 at a bridge connection, FIG. 9 is a schematic diagram of a connection between a first main body electrode 112 and a bridge portion 43, FIG. 10 is a single-layer schematic diagram of a bridge portion 43, and FIG. 11 is a single-layer schematic diagram of a second auxiliary electrode 211 of a second sub-electrode 21. Specifically, the first sub-electrode 11 and the second sub-electrode 21 may each include a plurality of holes T, and the touch-control display panel includes a base substrate 40, a display layer 41 located between the base substrate 40 and the first touch-control electrode 1, a metal layer located between the display layer 41 and the first touch-control electrode 1, and an insulation layer 44 located between the metal layer and the first touch-control electrode 1; the metal layer includes a bridge portion 43 that electrically connects first sub-electrodes 11 of adjacent first sub-electrode groups 10 through a via K penetrating through the insulation layer 44.

In one possible implementation mode, there is also an encapsulation layer 42 between the metal layer and the display layer 41.

In one possible implementation mode, referring to FIG. 8, the display layer 41 has a plurality of sub-pixels P; and an orthographic projection of a hole T on the base substrate 40 corresponds to an orthographic projection of a sub-pixel P on the base substrate 40. In this way, an influence of the first sub-electrode 11 and the second sub-electrode 21 on light output of the sub-pixels P may be avoided, and an influence on normal display of the touch-control display panel may be avoided.

Specifically, the display layer may include a drive layer and a light emitting device located on a side of the drive layer facing away from the base substrate, the drive layer may include a pixel circuit for driving the light emitting device to emit light, the pixel circuit may specifically include a thin film transistor and a capacitor, and the light emitting device may specifically include an anode, an organic emitting layer, and a cathode that are sequentially disposed. Specific structures of the pixel circuit and the light emitting device may be the same as those of an organic light emitting display panel and a quantum dot light emitting display panel in the prior art, which will not be repeated in the present disclosure here.

An embodiment of the present disclosure also provides a display apparatus, including the touch-control display panel according to the embodiment of the present disclosure.

In specific implementation, in an embodiment of the present disclosure, the display apparatus may be any product or component with a display function such as a mobile phone, a tablet computer, a television, a display, a notebook computer, a digital photo frame, a navigator, a watch, and a bracelet. Other essential components of the display apparatus are all components which should be understood to be included in the display apparatus by those of ordinary skill in the art, and will not be repeated here, and should not be taken as limitations on the present disclosure.

The embodiment of the present disclosure has following beneficial effects: in the embodiment of the present disclosure, a first touch-control electrode includes a plurality of first sub-electrode groups sequentially arranged along a first direction; a first sub-electrode group includes a plurality of first sub-electrodes sequentially arranged along a second direction CD and integrally connected, a first sub-electrode includes two first pattern blocks, a second pattern block located between the two first pattern blocks, and a first connection portion connecting the second pattern block and a first pattern block, which are arranged along the first direction; each second touch-control electrode includes a plurality of second sub-electrode groups sequentially arranged along the second direction and integrally connected; a second sub-electrode group includes a plurality of second sub-electrodes sequentially arranged along the second direction and integrally connected, a second sub-electrode includes two third pattern blocks, a fourth pattern block located between the two third pattern blocks, and a second connection portion connecting a third pattern block and the fourth pattern block, which are arranged along the first direction, so that the first touch-control electrode and the second touch-control electrode may form relatively large interaction, thereby solving problems in the prior art that ghost points are prone to being generated in a touch control process and a touch control semaphore is weak.

Apparently, those skilled in the art may make various modifications and variations to the present disclosure without departing from the spirit and scope of the present disclosure. Thus, if these modifications and variations to the present disclosure are within the scope of the claims of the present disclosure and their equivalent techniques, the present disclosure is intended to include these modifications and variations.

The invention claimed is:
1. A touch-control display panel, comprising:
a plurality of first touch-control electrodes, wherein each first touch-control electrode comprises a plurality of first sub-electrode groups sequentially arranged along a first direction, adjacent first sub-electrode groups are connected through a bridge;
a first sub-electrode group comprises a plurality of first sub-electrodes sequentially arranged along a second direction and connected, a first sub-electrode comprises two first pattern blocks, a second pattern block located between the two first pattern blocks, and a first connection portion that connects the second pattern block and a first pattern block, which are arranged along the first direction; and
a plurality of second touch-control electrodes, wherein each second touch-control electrode comprises a plurality of second sub-electrode groups sequentially arranged along the second direction and integrally connected; a second sub-electrode group comprises a plurality of second sub-electrodes sequentially arranged along the second direction and connected, a second sub-electrode comprises: two third pattern blocks, a fourth pattern block located between the two third pattern blocks, and a second connection portion connecting a third pattern block and the fourth pattern block, which are arranged along the first direction; and the second sub-electrode is located within a region surrounded by the first sub-electrode, and has substantially a same pattern as the surrounded region, and the second touch-control electrode and the first touch-control electrode are insulated from each other,
wherein the first pattern block, the second pattern block, the third pattern block, and the fourth pattern block are convex polygons, wherein the first touch-control electrode and the second touch-control electrode are disposed in a same layer and of a same material, wherein the touch-control display panel comprises a base substrate, a display layer located between the base substrate and the first touch-control electrode, a metal layer located between the display layer and the first touch-control electrode, and an insulation layer located between the metal layer and the first touch-control electrode; and the metal layer comprises a bridge portion that electrically connects first sub-electrodes of adjacent first sub-electrode groups through a via penetrating through the insulation layer.

2. The touch-control display panel according to claim 1, wherein the first pattern block is hexagonal and the second pattern block is prismatic; and the third pattern block is hexagonal and the fourth pattern block is prismatic.

3. The touch-control display panel according to claim 2, wherein the second pattern block has a first diagonal parallel to the second direction, two first pattern blocks of a same first sub-electrode are symmetrical about the first diagonal; and the fourth pattern block has a second diagonal parallel to the second direction, and two third pattern blocks of a same second sub-electrode are symmetrical about the second diagonal.

4. The touch-control display panel according to claim 3, wherein a maximum width of the second pattern block parallel to the second direction is greater than a maximum width of the first pattern block parallel to the second direction; and a maximum width of the fourth pattern block parallel to the second direction is greater than a maximum width of the third pattern block parallel to the second direction.

5. The touch-control display panel according to claim 4, wherein the first connection portion is rectangular, and a width of the first connection portion parallel to the second direction is smaller than a maximum width of the first pattern block parallel to the second direction; and the second connection portion is rectangular, and a width of the second connection portion parallel to the second direction is smaller than a maximum width of the third pattern block parallel to the second direction.

6. The touch-control display panel according to claim 5, wherein the first sub-electrode group comprises three first sub-electrodes sequentially arranged along the second direction, which are respectively two first auxiliary electrodes, and a first main body electrode located between the two first auxiliary electrodes;

the second sub-electrode group comprises three second sub-electrodes sequentially arranged along the second direction, which are respectively two second auxiliary electrodes and a second main body electrode located between the two second auxiliary electrodes; and one of the second auxiliary electrodes is spaced between a first symmetry axis of the second main body electrode parallel to the first direction and a second symmetry axis of the first main body electrode parallel to the first direction.

7. The touch-control display panel according to claim 2, wherein the first sub-electrode group comprises three first sub-electrodes sequentially arranged along the second direction, which are respectively two first auxiliary electrodes, and a first main body electrode located between the two first auxiliary electrodes;

the second sub-electrode group comprises three second sub-electrodes sequentially arranged along the second direction, which are respectively two second auxiliary electrodes and a second main body electrode located between the two second auxiliary electrodes; and one of the second auxiliary electrodes is spaced between a first symmetry axis of the second main body electrode parallel to the first direction and a second symmetry axis of the first main body electrode parallel to the first direction.

8. The touch-control display panel according to claim 3, wherein the first sub-electrode group comprises three first sub-electrodes sequentially arranged along the second direction, which are respectively two first auxiliary electrodes, and a first main body electrode located between the two first auxiliary electrodes;

the second sub-electrode group comprises three second sub-electrodes sequentially arranged along the second direction, which are respectively two second auxiliary electrodes and a second main body electrode located between the two second auxiliary electrodes; and one of the second auxiliary electrodes is spaced between a first symmetry axis of the second main body electrode parallel to the first direction and a second symmetry axis of the first main body electrode parallel to the first direction.

9. The touch-control display panel according to claim 4, wherein the first sub-electrode group comprises three first sub-electrodes sequentially arranged along the second direction, which are respectively two first auxiliary electrodes, and a first main body electrode located between the two first auxiliary electrodes;

the second sub-electrode group comprises three second sub-electrodes sequentially arranged along the second direction, which are respectively two second auxiliary electrodes and a second main body electrode located between the two second auxiliary electrodes; and one of the second auxiliary electrodes is spaced between a first symmetry axis of the second main body electrode parallel to the first direction and a second symmetry axis of the first main body electrode parallel to the first direction.

10. The touch-control display panel according to claim 1, wherein the first sub-electrode group comprises three first sub-electrodes sequentially arranged along the second direction, which are respectively two first auxiliary electrodes, and a first main body electrode located between the two first auxiliary electrodes;

the second sub-electrode group comprises three second sub-electrodes sequentially arranged along the second direction, which are respectively two second auxiliary electrodes and a second main body electrode located between the two second auxiliary electrodes; and one of the second auxiliary electrodes is spaced between a first symmetry axis of the second main body electrode parallel to the first direction and a second symmetry axis of the first main body electrode parallel to the first direction.

11. The touch-control display panel according to claim 10, wherein the adjacent first sub-electrode groups are connected by the first main body electrode through a bridge.

12. The touch-control display panel according to claim 10, wherein there is a first hollow region within the first pattern block of a first auxiliary electrode, and there are four second hollow regions within second pattern blocks of the first auxiliary electrode and the first main body electrode; the touch-control display panel further comprises a first floating electrode located in the first hollow region and a second floating electrode located in the second hollow region; and the third pattern block and the fourth pattern block of the second auxiliary electrode, and the third pattern block of the second main body electrode all have a third hollow region, and there are also four fourth hollow regions within the fourth pattern block of the second main body electrode; and the touch-control display panel further comprises a third floating electrode located in the third hollow region and a fourth floating electrode located in the fourth hollow region.

13. The touch-control display panel according to claim 12, wherein the first floating electrode is quadrilateral and a diagonal of the first floating electrode is parallel to the first direction; the second floating electrode is quadrilateral, and an outer contour surrounded by four second floating electrodes within a same second pattern block is similar to a shape of the second pattern block, and centers are substantially coincident; and the third floating electrode is quadrilateral, and a diagonal of the third floating electrode is parallel to the first direction; the fourth floating electrode is quadrilateral, and an outer contour surrounded by four fourth floating electrodes within a same fourth pattern block is similar to a shape of the fourth pattern block, and centers are substantially coincident.

14. The touch-control display panel according to claim 1, wherein the display layer has a plurality of sub-pixels; and the first sub-electrode and the second sub-electrode each comprise a plurality of holes, and an orthographic projection of a hole on the base substrate corresponds to an orthographic projection of a sub-pixel on the base substrate.

15. The touch-control display panel according to claim 14, wherein there is also an encapsulation layer between the metal layer and the display layer.

16. A display apparatus, comprising a touch-control display panel according to claim 1.

* * * * *